3,282,655
PRODUCTION OF $^{131}$I
Forrest N. Case and Elick H. Acree, Oak Ridge, Tenn., assignors to the United States of America as represented by the United States Atomic Energy Commission
No Drawing. Filed Feb. 18, 1966, Ser. No. 530,252
6 Claims. (Cl. 23—324)

The invention described herein was made in the course of, or under, a contract with the U.S. Atomic Energy Commission. This invention relates generally to methods for preparing radioisotopes and more particularly to an improved method for preparing $^{131}$I from irradiated target materials.

One method for preparing $^{131}$I previously employed an aluminum-clad uranium-aluminum alloy target material which was irradiated and processed for $^{131}$I removal and recovery. There the target material was contacted with caustic solution to remove the aluminum cladding and then contacted with nitric acid to dissolve the uranium-aluminum alloy wherein about 50% of the $^{131}$I was volatilized off along with some nitric and nitrous acid during dissolution and collected in a refrigerated condenser. The remaining $^{131}$I was released by adding sodium nitrite to the nitric acid to reduce the iodate to iodine which then readily distills with the addition of hydrogen peroxide. The condensed iodine, nitric and nitrous acid were re-distilled by addition of hydrogen peroxide and caught in a weak solution of sodium hydroxide. The iodine was then oxidized to non-volatile iodate with addition of potassium permanganate solution, and the nitric acid removed in a high temperature distillation process. The iodate finally was reduced to iodine and distilled into sulfurous acid from which $^{131}$I was obtained 99.9% pure exclusive of $^{133}$I. These processes required extensive post-irradiation processing and generally required a high temperature distillation operation before the final product of adequate radiochemical purity was obtained. From the foregoing, it can be seen that a simplified recovery process of the product iodine is highly desirable.

It is therefore a primary object of this invention to provide an improved production method for producing radioisotopes, especially $^{131}$I.

Another object is to provide a method for producing $^{131}$I from irradiated uranium-aluminum alloys wherein the uranium component of the alloy is not dissolved.

A still further object is to provide a method for obtaining $^{131}$I of increased purity from an aluminum-clad, uranium-aluminum alloy target material by aqueous processing.

Still a further object is to provide a method for reducing $^{131}$I losses to waste streams in an iodine recovery process.

These objects and others which will be apparent to those skilled in the art are accomplished by dissolving the irradiated target material containing $^{131}$I with caustic solution, filtering said resulting caustic solution to remove solids, acidifying the resulting filtrate with sulfuric acid while sparging said filtrate with an oxygen-containing gas and thereafter recovering said $^{131}$I in purified form. Applicants have found that contrary to previous practice, $^{131}$I could be removed and recovered from irradiated target materials without dissolving the core i.e., the uranium values remain along with certain fission products as solids which may be filtered off, after the cladding and aluminum component of the target alloy is removed by caustic dissolution. Previously, the aluminum cladding was first removed by caustic dissolution, and the remaining solids dissolved in nitric acid with the uranium and associated fission products going into solution. With the present process, however, it has been found that the iodine is associated with the aluminum component of the target alloy and dissolution of the aluminum results in essentially all of the iodine produced during irradiation of the target material going into solution as sodium iodide. The $^{131}$I product is of very high radiochemical purity with a specific activity of approximately 70% of theoretical. Overall yields of greater than 90% have been demonstrated for full scale runs of ~200 curies.

The target material may vary widely and generally comprises an uranium-aluminum alloy which is rolled into a sheet and clad with an aluminum cladding to form a sandwich-type capsule. One such unit may comprise, for example, 2.5 grams of uranium (93% $^{235}$U) alloyed with 16 grams of aluminum and clad with 10-mil aluminum. The sandwich target is then formed as a hollow tube, approximately 1¾ inch diameter and 4½ inches long. Irradiation of one of these targets for four weeks at a flux of ~2×10$^{14}$ n/cm.$^2 \cdot$sec. produces 200 curies of $^{131}$I with other quantities of specific radioisotopes.

Processing of the irradiated target is delayed after irradiation for 3–5 days to allow decay of $^{132,133,134}$I present in the fission-product mixture. The target material is then dissolved in 700 ml. of 4.5 M NaOH solution, and this dissolver solution permitted to age for about twelve hours to allow the sodium aluminate in the caustic solution to deposit as aluminum trihydrate ($Al_2O_3 \cdot 3H_2O$). This removed most of the $^{103}$Ru and other fission products, except $^{131}$I, $^{134,137}$Cs and $^{99}$Mo. During the dissolution $^{133}$Xe is released as a gas which may be separated from water vapor by passing through a series of liquid nitrogen cooled traps and a sulfuric acid scrubber. The solution was then filtered to remove the aluminum hydrate along with undissolved uranium by filtering through a fritted glass with the $^{131}$I remaining in the filtered solution as sodium iodide.

After removal of the solids by filtration, the filtrate containing the iodine as sodium iodide is placed in a flask fitted with a fritted glass sparge tube which extended below the surface of the liquid. The flask (5-liter capacity) was connected to a scrubber containing 0.1 M NaOH and 0.01 wt. percent sodium sulfite. The system is arranged so that a vacuum applied to the scrubber caused air to be drawn through the sparge tube, through the solution in the flask and finally through the scrubber solution.

The caustic dissolver solution (filtrate) is next acidified while being continuously sparged. For this, sulfuric acid is slowly added to the NaOH solution to convert the Na$^{131}$I to H$^{131}$I. Approximately 800 ml. of 4.5 M H$_2$SO$_4$ employed in this acidification operation and while any oxygen-containing gas may be employed for sparging, ambient air is preferred. The air sparge serves to oxidize the H$^{131}$I to elemental iodine and sweeps it into the scrubber where it is collected in the NaOH–Na$_2$SO$_3$ mixture as Na$^{131}$I. Air sparge flow rates of 20 L STP/hr. have been found to be quite suitable.

The acidification-air sparging is carried out without external heating and unlike previous practices does not require the provision of high temperature equipment and apparatus. Moreover, while air sparging of nitric acid solutions containing iodine was found to require high temperature operations, sparging at or about room temperature has been found to be quite effective with subsequent recoveries of essentially all of the iodine produced in the irradiated target.

Final purification of the $^{131}I$ is achieved by selectively sorbing the $^{131}I$ from the scrubber solution, which was made approximately 1 N with respect to $H_2SO_4$, onto a platinum felt. Applicants have found that the platinum sorber or felt prepared by saturating low ash filter paper with a platinum solution ($H_2PtCl_6$) and igniting the paper to decompose the platinum salt to the elemental form is much more effective than other platinum surfaces, such as etched sheets or gauze, for $^{131}I$ sorption. The cellulose fibers of the paper are replicated to form a highly extended platinum surface onto which the iodine can be readily sorbed from $H_2SO_4$ solutions. For this, approximately 10 grams of platinum felt is used per 250 curies of $^{131}I$ with solution volume being held to a minimum to optimize contact of the sorption solution with platinum in the static system. The quantity of iodine sorbed onto the platinum is shown in Table I below. It should be noted hereinafter that by infinite platinum it is meant that surface area of platinum in excess of that required for saturation with available iodine.

TABLE I.—SORPTION OF $^{131}I$ ONTO PLATINUM FELT

| Run | Percent Sorbed | Time (hr.) |
|---|---|---|
| With NaI in 1 M $H_2SO_4$ [1] | 40 | 0.5 |
|  | 52 | 1.0 |
|  | 68 | 1.5 |
|  | 78 | 2.0 |
|  | 83 | 3.0 |
|  | 89 | 4.0 |
|  | 90 | 5.0 |
|  | 95 | 6.0 |
|  | 97 | 7.0 |
| With NaI in 2 M $H_2SO_4$ [2] | 35 | 0.5 |
|  | 49 | 1.0 |
|  | 66 | 2.0 |
|  | 76 | 3.0 |
|  | 83 | 4.0 |
|  | 89 | 5.0 |
|  | 90 | 6.0 |
|  | 92 | 7.0 |
| With NaI in 1 M $H_2SO_4$ [3] | 9 | 0.5 |
|  | 15 | 1.0 |
|  | 22 | 1.5 |
|  | 30 | 2.0 |
|  | 41 | 3.0 |
|  | 43 | 4.0 |
|  | 61 | 6.0 |
|  | 68 | 7.0 |

[1] Includes 0.01% $NaHSO_3$ infinite platinum.
[2] Includes 0.01% $NaHSO_3$ infinite platinum.
[3] Includes 0.01% $NaHSO_3$ 100 mg. platinum.

As may be seen from the tabulated data above, about 80% of the iodine is sorbed after about four hours. The solution is then drained, and the platinum washed several times with distilled water.

The $^{131}I$ is desorbed from the platinum by covering it with a minimum volume of 0.3 M NaOH solution containing 0.01 wt.% $Na_2SO_3$. The quantity of iodine desorbed from the platinum felt is shown in Table II below.

TABLE II.—DESORPTION OF $^{131}I$ ONTO PLATINUM FELT

| Run | Percent Desorbed | Time (hr.) |
|---|---|---|
| With 0.1 M NaOH [1] | 35 | 0.5 |
|  | 42 | 1.0 |
|  | 48 | 1.5 |
|  | 50 | 2.5 |
|  | 52 | 3.5 |
|  | 52 | 4.5 |
|  | 56 | 5.5 |
|  | 58 | 6.5 |
| With 1.0 M NaOH [2] | 65 | 0.5 |
|  | 69 | 1.0 |
|  | 73 | 2.5 |
|  | 74 | 3.5 |
|  | 82 | 5.5 |
|  | 84 | 6.5 |

[1] Including 0.01% $NaHSO_3$.
[2] Including 0.01% $NaHSO_3$.

From the foregoing, about 80% of the iodine is released from the platinum after about four hours. The stripping solution is removed through a Millipore filter membrane and the platinum washed with three portions of distilled water.

The $^{131}I$ product obtained is of very high radiochemical purity and is of a higher specific activity than that prepared by irradiation of tellurium. An average analysis of several products is shown in Table III below.

TABLE III

| | |
|---|---|
| $^{131}I$ | 2144 mc./ml. |
| $^{103}Ru$ | $<\times 10^{-8}$ mc./mc. $^{131}I$. |
| Gross alpha | <4 c.p.m./mc. $^{131}I$. |
| Heavy metals | Below limit of detection. |
| $I^-/IO_3^-$ ratio | >99.9%. |
| Specific activity | ~70% of theoretical. |

What is claimed is:

1. A method for preparing $^{131}I$ from an irradiated target material containing same, comprising the steps of dissolving said target material in a caustic solution, filtering said resulting caustic solution to remove formed solids, acidifying the resulting filtrate with sulfuric acid while sparging said filtrate with an oxygen-containing gas and thereafter recovering said $^{131}I$ in purified form.

2. The method of claim 1 wherein said target material comprises an uranium-aluminum alloy core clad with aluminum.

3. The method of claim 1 wherein said caustic solution is NaOH.

4. The method of claim 1 wherein said oxygen-containing gas is ambient air.

5. The method of claim 1 wherein said $^{131}I$ recovery step comprises collecting the evolved iodine from said gas purge in a caustic scrubber solution, acidifying said iodine-containing scrubber solution with sulfuric acid, separating said iodine from said acidified caustic scrubber solution by selectively sorbing said iodine on a platinum sorber and thereafter recovering the purified iodine product from said platinum sorber in a caustic wash solution.

6. The method of claim 5 wherein said platinum sorber comprises replicated cellulose fibers containing elemental platinum which is formed by the thermal decomposition of a platinum salt.

References Cited by the Examiner

FOREIGN PATENTS 763,865  12/1956  Great Britain.

L. DEWAYNE RUTLEDGE, *Primary Examiner.*

S. TRAUB, *Assistant Examiner.*